United States Patent
Jang et al.

(10) Patent No.: US 10,164,471 B2
(45) Date of Patent: Dec. 25, 2018

(54) TRANSMITTER FOR WIRELESS CHARGER

(71) Applicant: AMOSENSE CO., LTD, Chungcheongnam-do (KR)

(72) Inventors: Kil Jae Jang, Seongnam-si (KR); Dong Hoon Lee, Yongin-si (KR); Min Sik Jang, Incheon (KR); Ki Chul Kim, Incheon (KR); Jong Ho Park, Seoul (KR)

(73) Assignee: AMOSENSE CO., LTD, Chungcheongnam-do (KR)

( * ) Notice: Subject to any disclaimer, the term of this patent is extended or adjusted under 35 U.S.C. 154(b) by 39 days.

(21) Appl. No.: 15/525,044

(22) PCT Filed: Nov. 6, 2015

(86) PCT No.: PCT/KR2015/011886
§ 371 (c)(1),
(2) Date: May 5, 2017

(87) PCT Pub. No.: WO2016/072779
PCT Pub. Date: May 12, 2016

(65) Prior Publication Data
US 2018/0269716 A1    Sep. 20, 2018

(30) Foreign Application Priority Data
Nov. 7, 2014  (KR) .................... 10-2014-0154725

(51) Int. Cl.
*H02J 50/10* (2016.01)
*H01F 27/36* (2006.01)
(Continued)

(52) U.S. Cl.
CPC .............. *H02J 50/10* (2016.02); *H01F 27/36* (2013.01); *H02J 7/025* (2013.01); *H02J 50/40* (2016.02); *H02J 50/70* (2016.02)

(58) Field of Classification Search
CPC ....................................................... H02J 50/10
(Continued)

(56) References Cited

U.S. PATENT DOCUMENTS 6,301,085 B1 * 10/2001 Sato ...................... B82Y 10/00
                                                               360/317
2011/0050382 A1   3/2011 Baarman et al.
(Continued)

FOREIGN PATENT DOCUMENTS

CN      102906828 A      1/2013
JP      2012-119496 A    6/2012
(Continued)

OTHER PUBLICATIONS

WIPO, Korean International Search Authority, International Search Report with English translation and Written Opinion dated Mar. 4, 2016 in International Patent Application No. PCT/KR2015/011886, 11 pages.

(Continued)

*Primary Examiner* — Suresh Memula
(74) *Attorney, Agent, or Firm* — Masuvalley & Partners (57) ABSTRACT

Provided is a transmission device for a wireless charger. A transmission device for a wireless charger in accordance with exemplary embodiments of the present invention comprises: a plurality of planar coils which transmit a wireless power signal for wireless charging and which are arranged so as to be at least partially overlapped with each other; a shielding sheet which has an attachment surface to which a part or all of the planar coils are fixed by the medium of an adhesive layer, and which shields a magnetic field generated from the planar coils; and a height deviation compensation means which is provided on the attachment surface and which compensates for individual height deviation between each planar coil and the attachment surface.

11 Claims, 7 Drawing Sheets

(51) Int. Cl.
*H02J 50/70* (2016.01)
*H02J 7/02* (2016.01)
*H02J 50/40* (2016.01)

(58) Field of Classification Search
USPC .......................................................... 320/108
See application file for complete search history.

(56) References Cited

U.S. PATENT DOCUMENTS

2017/0012458 A1* 1/2017 Song ...................... H05K 1/165
2018/0090974 A1* 3/2018 Elkayam ................. H02J 7/025

FOREIGN PATENT DOCUMENTS

| KR | 10-1134625 B1 | 4/2012 |
| KR | 10-1228556 B1 | 2/2013 |
| KR | 10-2014-0019955 A | 2/2014 |
| KR | 10-2014-0142139 A | 12/2014 |

OTHER PUBLICATIONS

SIPO, Chinese Patent Office Action dated Jul. 3, 2018 in Chinese Patent Application No. 201580060094.4, 7 pages.

* cited by examiner

PRIOR ART

TRANSMITTER FOR WIRELESS CHARGER

RELATED APPLICATIONS

This application is the U.S. National Phase of and claims priority to International Patent Application No. PCT/KR2015/011886, International Filing Date Nov. 6, 2015, entitled Transmitter For Wireless Charger, which claims benefit of Korean Patent Application No. KR10-2014-0154725 filed Nov. 7, 2014 entitled Transmission Device For Wireless Charging Apparatus; both of which are incorporated herein by reference in their entireties.

TECHNICAL FIELD

The present invention relates to a transmission device for a wireless charger, and more particularly, to a transmission device for a wireless charger, capable of preventing efficiency from being decreased due to an arrangement position of a planar coil.

BACKGROUND ART

There are a contact type charging method and a noncontact type charging method in methods of charging a secondary battery mounted in an electronic device such as a portable terminal, a video camera, and the like. The contact type charging method performs charging by allowing an electrode of a power receiving apparatus and an electrode of a power feeding apparatus to come into contact with each other.

Due to a simple device-structure thereof, the contact type charging method is generally used in various application fields. However, there is present a difficulty in connecting connectors according to charging a battery that is a power source using a wired charger.

To solve this, the noncontact type charging method using electromagnetic induction by installing corresponding coils at both sides of a power receiving apparatus and a power feeding apparatus has been provided.

A noncontact type charger is reduced in size by winding coils around a ferrite core as a magnetic core.

In this case, the power feeding apparatus is formed using a method of arranging a plurality of planar coils to allow a part to be overlapped with one another and then fixing the coils to a shielding sheet using adhesives.

Figure 1:
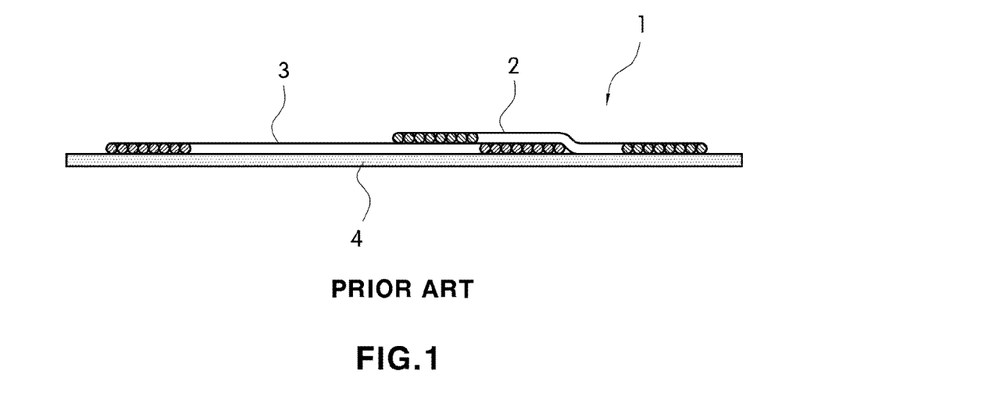
FIG. 1 is a cross-sectional view of a conventional transmission device for a wireless charger.
Figure 2:
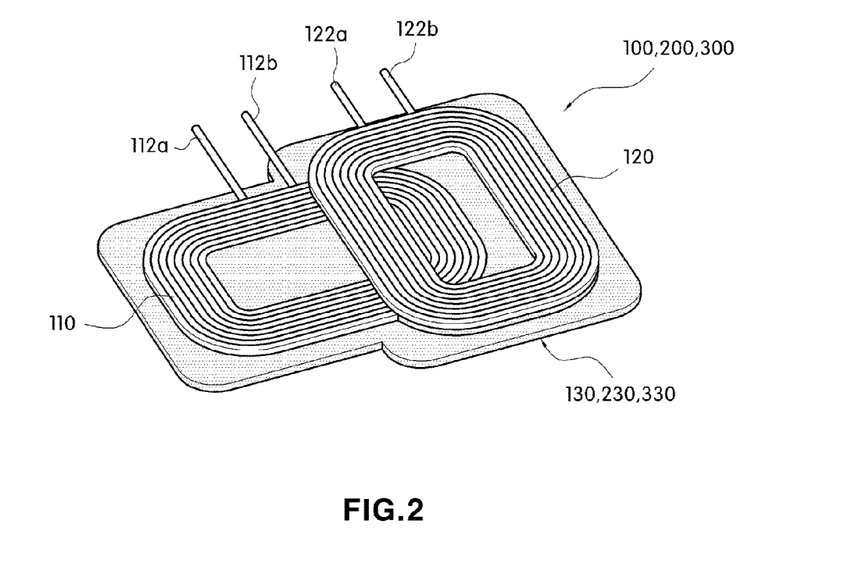
FIG. 2 is a schematic diagram of a whole transmission device for a wireless charger according to one embodiment of the present invention.

That is, a plurality of planar coils 2 and 3 are connected to stack a part of a planar coil 2 above a planar coil 3 to allow a part to be mutually overlapped. In the case of the plurality of planar coils 2 and 3 connected while partially overlapped as described above, the planar coil partially stacked thereabove does not come into direct contact with a shielding sheet 4 due to a thickness of the planar coils.

To solve this, a method of allowing other parts except an overlapped part to come into contact with a shielding sheet by forming a step structure by mechanically twisting a part of the planar coil stacked thereabove.

However, during a process of mechanically twisting or bending the planar coil, the planar coil is damaged and a defective occurs.

Additionally, since an additional operation of mechanically twisting the planar coil partially stacked thereabove to allow the planar coil to come into contact with the shielding sheet is necessary, a manufacturing process is complicated and inconvenient and production yield is reduced.

DISCLOSURE OF INVENTION

Technical Problem

The present invention provides a transmission device for a wireless charger, capable of preventing efficiency from being decreased by a height difference even though a plurality of planar coils are arranged on one surface of a shielding sheet to be partially overlapped with one another.

Technical Solution

One aspect of the present invention provides a transmission device for a wireless charger, including a plurality of planar coils configured to transmit wireless power signals for wireless charge and arranged to be at least partially overlapped, a shielding sheet that includes an attachment surface to which part of or the whole planar coils are fixed with an adhesive layer therebetween and shields a magnetic field generated by the planar coils, and a height deviation compensation means provided on the attachment surface to compensate an individual height deviation between each of the planar coils and the attachment surface.

The height deviation compensation means may be a first protruding sheet that protrudes from the attachment surface at a certain height.

The plurality of planar coils may include a first coil with one surface in direct contact with the attachment surface and a second coil stacked on the first coil to allow a part overlapped with the first coil and another part spaced apart from the attachment surface at a certain height, and the part of the second coil not overlapped with the first coil may come in direct contact with the first protruding sheet.

The first protruding sheet may be formed of a shielding sheet including a magnetic material to shield the magnetic field generated by the planar coils.

The first coil may be provided to have an empty space at a center portion thereof, and the attachment surface may include a second protruding sheet that protrudes at a certain height from an area thereof corresponding to the empty space in such a way that a side portion of the first coil comes into direct contact with the second protruding sheet.

The second protruding sheet may be formed of a shielding sheet including a magnetic material to shield the magnetic field generated by the planar coils.

The height deviation compensation means may be a mounting groove depressed at a certain depth from the attachment surface.

The plurality of planar coils may include a first coil with one surface in direct contact with a bottom surface of the mounting groove and a second coil stacked on the first coil to allow a part to be overlapped with the first coil and another part to come into direct contact with the attachment surface.

The first coil may be provided to have an empty space at a center portion thereof, and the bottom surface of the mounting groove may include a protrusion that protrudes at a certain height from an area thereof corresponding to the empty space in such a way that a side portion of the first coil comes into direct contact with the protrusion.

The mounting groove may include a plurality of mounting grooves having different depths, and the plurality of planar coils may be arranged to come into contact with bottom surfaces of mutually different ones of the plurality of mounting grooves.

Another aspect of the present invention provides a transmission device for a wireless charger, including a shielding sheet that includes an attachment surface and shields a magnetic field generated by a wireless power signal, a first coil that generates a wireless power signal and has one surface in contact with the attachment surface, a second coil that generates a wireless power signal and is stacked on the first coil to allow a part thereof to be overlapped with the first coil and another part to be spaced apart from the attachment surface at a certain height, and a protruding sheet that protrudes from the attachment surface at a certain height to compensate a height difference between the part of the second coil not overlapped with the first coil and the attachment surface.

Advantageous Effects

According to the embodiments of the present invention, a transmission device for a wireless charger may provide a plurality of planar coils having the same efficiency by removing an influence caused by a height difference using a height deviation compensation means even though the plurality of planar coils are disposed to allow a part to be mutually overlapped.

MODE FOR INVENTION

Hereinafter, embodiments of the present invention will be described in detail with reference to the attached drawings to allow one of ordinary skill in the art to easily implement. The present invention may be embodied in several various forms and is not limited to the embodiments described herein. In the drawings, to definitely describe the present invention, parts irrelevant to the description are omitted. Throughout the drawings, like reference numerals refer to like elements.

Referring to FIGS. 2 to 9, transmission devices 100, 100', 200, and 200' for a wireless charger according to embodiments of the present invention include planar coils 110 and 120, shielding sheets 130, 230, or 330, and a height deviation compensation means.

The planar coils 110 and 120 transmit a wireless power signal to a portable electronic device such as a cellular phone, a PDA, a PMP, a tablet, a multimedia device and the like to transfer power needed by the portable electronic device and function as transmission coils (Tx coils).

That is, the portable electronic device receives the wireless power signal transmitted from the planar coils 110 or 120 and receives power through an inductive coupling method based on an electromagnetic induction phenomenon.

Here, the portable electronic device includes separate coils (reception coils (Rx coils)) corresponding to the planar coils 110 or 120, in which a magnetic field changes at one coil due to the electromagnetic induction phenomenon and a current is induced at another coil, and receives power.

Since the above-described inductive coupling method is a well-known art, a detailed description thereof will be omitted.

The planar coil 110 or 120 is provided in a circular, oblong, or quadrangular planar shape wound clockwise or counterclockwise and is wound to form empty spaces 114 or 124 in the center portion thereof. The empty space 114 or 124 of the planar coil 110 or 120 may have a circular, oblong, or a quadrangular shape. Also, other components, for example, connection terminals 112a, 112b, 122a, or 122b for electric connections with a circuit board protrude from both ends of the planar coils 110 or 120.

In this case, a plurality of such planar coils 110 and 120 are arranged to be adjacent to each other on one surfaces of the shielding sheets 130, 230, or 330 and one of the two planar coils 110 and 120 adjacently arranged is disposed above another to be partially overlapped with each other.

Hereinafter, for convenience of description, there are provided the two planar coils 110 and 120, and a planar coil disposed relatively below will be referred to as a first coil 110 and a planar coil disposed relatively above will be referred to as a second coil 120. Additionally, it will be described that the first coil 110 is disposed leftward and the second coil 120 is disposed rightward, a part of the second coil 120 is disposed above the first coil 110 to be overlapped, and overlapped parts thereof are fixed to each other through adhesives.

However, the present invention is not limited to the combination and arrangements described above and top and bottom arrangement of the first coil 110 and the second coil 120 and the number of totally provided planar coils may be variously changed.

The shielding sheet 130, 230, or 330 is formed of planar members having certain areas and shield and focus a magnetic field generated by wireless frequency signals at the first coil 110 and the second coil 120 in a desired direction.

For example, the shielding sheets 130, 230, or 330 may be provided as ribbon sheets of an amorphous alloy or a nano crystal grain alloy and may be formed of various materials such as ferrite sheets, polymer sheets, Permalloy and the like.

In this case, the shielding sheets 130, 230, or 330 may be formed of a plurality of stacked sheets. In the case of the plurality of stacked sheets, a plurality of magnetic sheets formed of the same material may be stacked or a plurality of magnetic sheets formed of different materials may be stacked.

Also, the shielding sheets 130, 230, or 330 may be subject to a flake process to be divided into a plurality of minute pieces so that power transmission efficiency is increased minute pieces by reducing a loss caused due to an eddy current by increasing the entire resistance or preventing cracks or a change in characteristics caused due to cracks by improving flexibility of the sheets.

In this case, when the shielding sheet is formed of a plurality of separate minute pieces, the plurality of minute pieces may be formed to be amorphous and some or the entire of minute pieces adjacent to one another may be electrically insulated.

Figure 10:
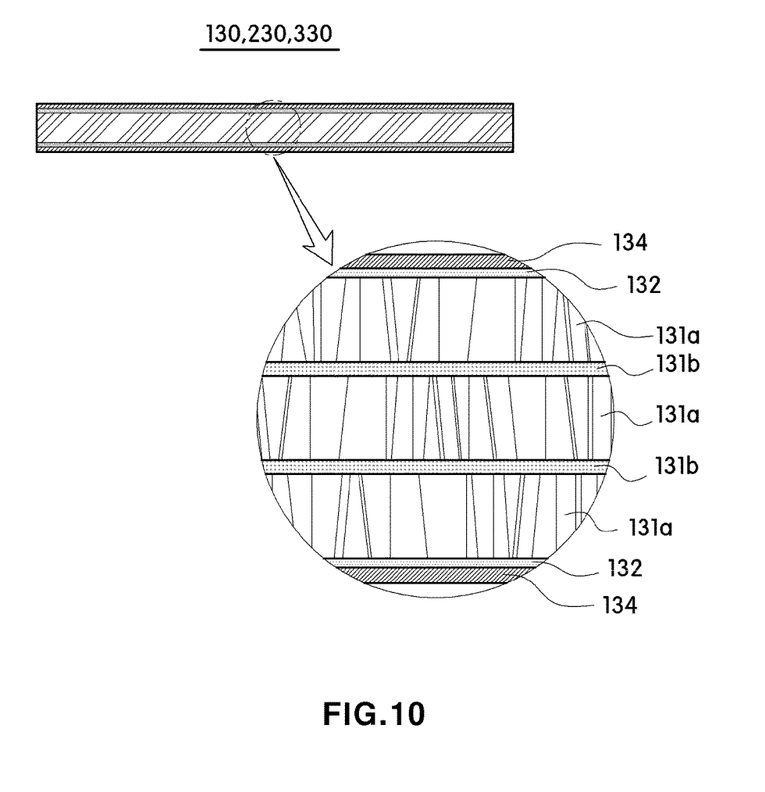
FIG. 10 is a schematic diagram illustrating a case in which a shielding sheet applied to the transmission device for a wireless charger according to the present invention includes a plurality of minute pieces separately formed.

For example, as shown in FIG. 10, the shielding sheets 130, 230, or 330 may be provided as a plurality of ribbon sheets 131a formed of an amorphous alloy or a nano crystal grain alloy stacked with adhesive layers 131b interposed therebetween and the ribbon sheets 131a of the amorphous alloy or nano crystal grain alloy may be subject to a flake process to be divided into a plurality of minute pieces.

In this case, when the plurality of ribbon sheets 131a of the amorphous alloy or the nano crystal grain alloy separately formed as the plurality of minute pieces are stacked, the adhesive layers 131b disposed among the ribbon sheets 131a may include nonconductive components.

At least parts of the adhesive layers 131b permeate each of the stacked ribbon sheets and move among the minute pieces to do functions of preventing movements of the plurality of minute pieces forming each of the ribbon sheets and insulating the minute pieces from one another. Through this, the minute pieces are prevented from coming into contact with one another and remain in a mutually separated state to increase power transmission efficiency by reducing a loss caused by an eddy current.

Here, the adhesive layers may be provided as adhesives and may be provided as a film type material which adhesives is coated on one or both sides thereof. Additionally, additional protection films 134 for protecting the shielding sheets 130, 230, or 330 from an external force may be attached to at least one surface of each of the shielding sheets 130, 230, and 330 with adhesive layers 132 interposed therebetween.

The shielding sheets 130, 230, or 330 may employ any thing that includes a magnetic material to shield the magnetic field generated by the wireless frequency signals from the first coil 110 and the second coil 120.

The first coil 110 and the second coil 120 are fixed to one surfaces (attachment surfaces (130a, 230a, or 330a) of the shielding sheets 130, 230, or 330 with adhesive layers interposed therebetween.

Here, the adhesive layers may be glue, PVC, rubber, or a double-sided tape having adhesive properties and may include components having conductivity.

That is, a lower surface of the first coil 110 comes into contact with the attachment surface and fixed with adhesives interposed therebetween. Accordingly, the second coil 120 disposed above the first coil 110 to be partially overlapped becomes a state in which other parts except a part overlapped with the first coil 110 are spaced apart from the attachment surface at a certain height due to a thickness of the first coil 110.

In this case, the shielding sheet 130 according to one embodiment of the present invention includes an additional height deviation compensation means disposed below the second coil 120 spaced apart from the attachment surface at a certain height not to form an empty space between a bottom surface of the second coil 120 and the attachment surface.

Figure 3:
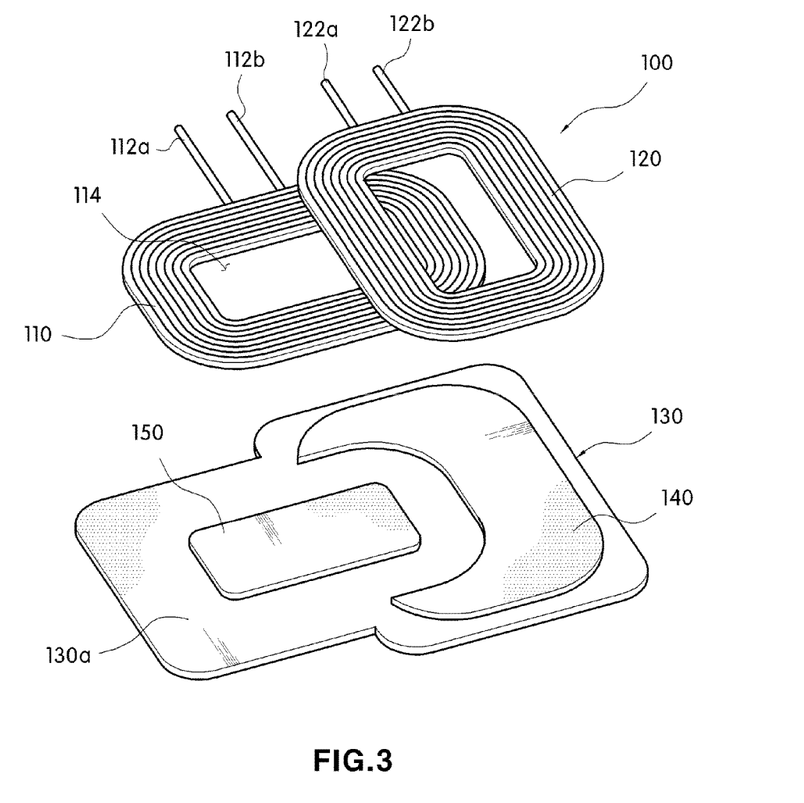
FIG. 3 is an exploded perspective view of the transmission device for a wireless charger according to one embodiment of the present invention.
Figure 4:
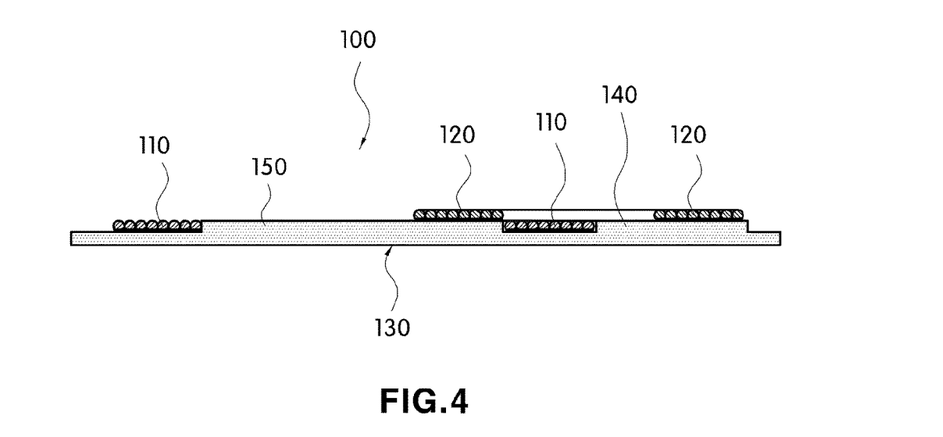
FIG. 4 is a cross-sectional view of the combined transmission device of FIG. 3.

For this, between the second coil 120 and the attachment surface 130a of the shielding sheet 130, as shown in FIGS. 3 and 4, a first protruding sheet 140 having a certain height is provided to protrude from the attachment surface 130a.

Here, the first protruding sheet 140 is provided to have an area identical or greater than a lower area corresponding to the part of the second coil 120 not overlapped with the first coil 110 and provided to have a thickness approximately identical to a height of the first coil 110.

Accordingly, the second coil 120 disposed above the first coil 110 to be partially overlapped comes into contact with the first protruding sheet 140 at the other part except the part overlapped with the first coil 110.

Due to this, to allow the second coil 120 to come into contact with the attachment surface 130a of the shielding sheet 130, a conventional operation of mechanically twisting or bending a part of the second coil 120 is unnecessary.

In this case, the first protruding sheet 140, like the shielding sheet 130, may employ a magnetic field shielding sheet including a magnetic material to shield the magnetic field generated by the wireless frequency signal.

Accordingly, the bottom surface of the second coil 120 also comes into contact with the magnetic field shielding sheet like the first coil 110. Due to this, when the first coil 110 and the second coil 120 are arranged to be partially overlapped, unlike a conventional case in which performance of the second coil 120 is decreased compared with the first coil 110 with the bottom surface in complete contact with the shielding sheet, the transmission device 100 or 100' according to one embodiment of the present invention may obtain approximately identical performance at the first coil 110 and the second coil 120.

Also, a second protruding sheet 150 that protrudes by a certain height may be provided in an area of the attachment surface 130a of the shielding sheet 130 corresponding to the empty space 114 formed in the center portion of the first coil 110. The second protruding sheet 150 is provided to have an approximately identical thickness as the height of the first coil 110 and to have a shape and an area approximately identical to the empty space 114 formed in the center portion of the first coil 110.

The above-described second protruding sheet 150 is inserted into the empty space 114 during a process of fixing the first coil 110 to the attachment surface 130a. Accordingly, a movement of the first coil 110 is prevented by inserting the second protruding sheet 150 into the empty space 114 of the first coil 110 to easily perform a fixing operation by precisely positioning the first coil 110.

Additionally, the second protruding sheet 150, like the shielding sheet, may employ a magnetic field shielding sheet including a magnetic material to shield the magnetic field generated by the wireless frequency signal.

Due to this, a side of the first coil 110 disposed along an edge of the second protruding sheet 150 also comes into surface-contact with the second protruding sheet 150 to increase the whole performance by efficiently suppressing an influence of the magnetic field.

Here, the first protruding sheet 140 and the second protruding sheet 150 may be formed of the same material as that of the shielding sheet 130 or may be formed of a different material therefrom.

Figure 5:
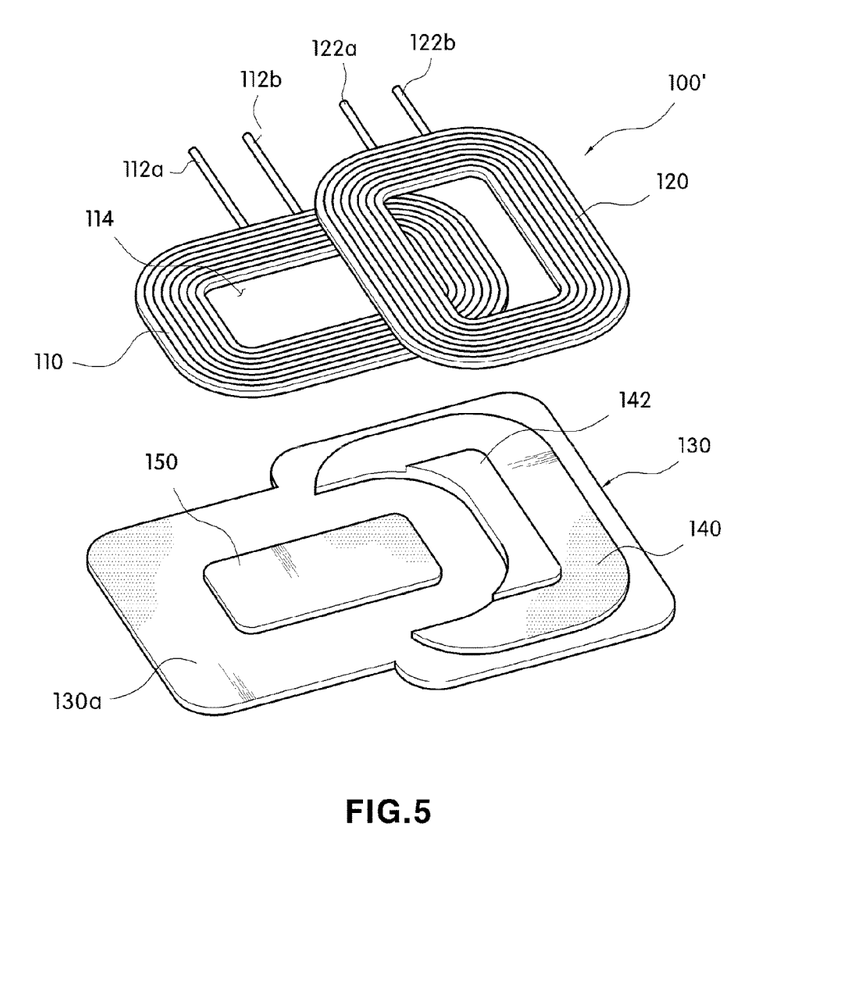
FIG. 5 is a view illustrating a modified example of the transmission device of FIG. 3.

Meanwhile, as shown in FIG. 5, a protrusion 142 having an area corresponding to another part of the empty space 124 formed in the center portion of the second coil 120 not overlapped with the first coil 110 may be provided at the first protruding sheet 140.

The protrusion 142 is provided to be formed of a magnetic shielding sheet like the first protruding sheet 140 and to have a height approximately identical to the height of the second coil 120 to allow an inner side part of the second coil 120 to come into surface contact.

Here, the second protruding sheet 150 and the protrusion 142 have been illustrated and described in the drawings and the description as being provided to have planar shapes having certain areas but are not limited thereto and may be provided in a linear shape with a hollow center portion having a certain thickness.

Figure 6:
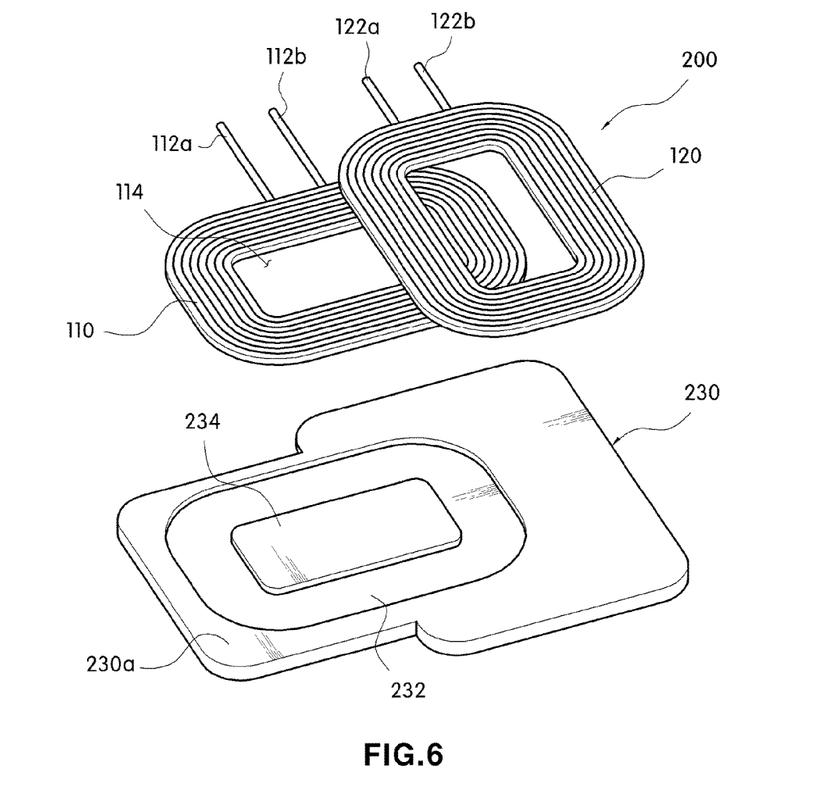
FIG. 6 is an exploded perspective view of the transmission device for a wireless charger according to another embodiment of the present invention.
Figure 7:
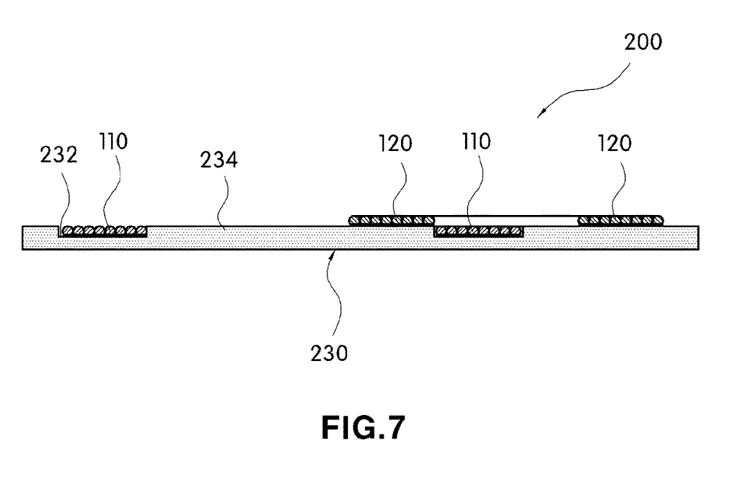
FIG. 7 is a cross-sectional view of the combined transmission device of FIG. 6.

Meanwhile, as shown in FIGS. 6 and 7, the transmission device 200 for a wireless charger according to another embodiment of the present invention is compensated with a height deviation between an attachment surface of the shielding sheet 230 and the first coil 110 or the second coil 120 generated by an overlapped part during a process of fixing the first coil 110 and the second coil 120 to the attachment surface of the shielding sheet 230 in a different method.

That is, as shown in FIG. 6, the shielding sheet 230 may include a mounting groove 232 formed to be depressed below at a certain depth from the attachment surface 230a to have the same area as a lower area of the first coil 110.

Here, the mounting groove 232 is formed to be depressed at a depth as long as the height of the first coil 110.

Due to this, a bottom surface of the first coil 110 comes into surface-contact with a bottom surface of the mounting groove 232 and the bottom surface of the second coil 120 is disposed to come into surface-contact with the attachment surface 230a and then fixed with adhesives interposed therebetween.

Accordingly, the bottom surfaces of the first coil 110 and the second coil 120 constantly remain in a state of being in contact with the shielding sheet 230.

In this case, a protrusion 234 having the same area as that of the empty space 114 formed in the center portion of the first coil 110 may be provided in the mounting groove 232.

Here, the protrusion 234 may perform the same function as that of the second protruding sheet 150 described above.

Figure 8:
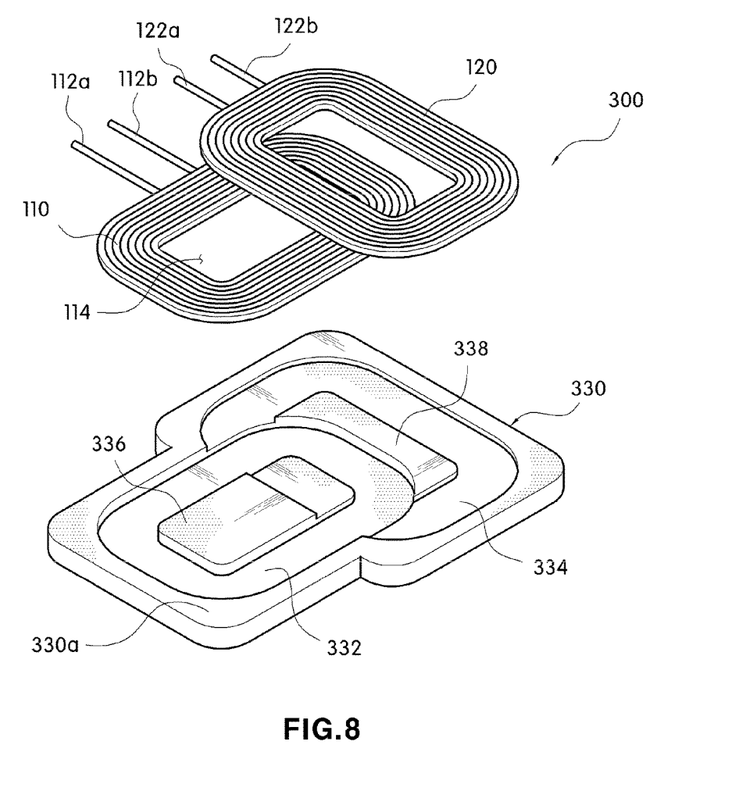
FIG. 8 is an exploded perspective view of the transmission device for a wireless charger according to still another embodiment of the present invention.
Figure 9:
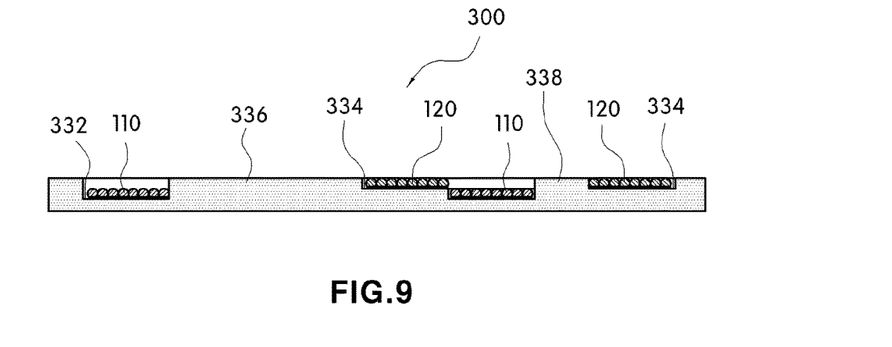
FIG. 9 is a cross-sectional view of the combined transmission device of FIG. 8.

Meanwhile, FIGS. 8 and 9 illustrate still another embodiment. That is, a transmission device 300 for a wireless charger according to still another embodiment of the present invention may include a plurality of mounting grooves 332 and 334 formed to be depressed below at different depths from the attachment surface 330a of the shielding sheet 330 to compensate the height deviation between the attachment surface 330a of the shielding sheet 330 and the first coil 110 and the second coil 120.

In detail, the mounting grooves 332 and 334 may include a first mounting groove 332 that accommodates the bottom surface of the first coil 110 and a second mounting groove 334 that accommodates another part of the bottom surface of the second coil 120 except a part of the bottom surface partially overlapped with the first coil 110.

In this case, the first mounting groove 332 is provided to have a relatively greater depth than that of the second mounting groove 334 and have a height of a step between the first mounting groove 332 and the second mounting groove 334 which is approximately identical to the height of the first coil 110.

Additionally, a first protrusion 336 corresponding to the empty space 114 formed in the first coil 110 is provided in the first mounting groove 332, and a second protrusion 338 corresponding to another part of the empty space 124 formed in the second coil 120 except a part overlapped with the first coil 110 is provided in the second mounting groove 334.

Due to this, the bottom surface of the first coil 110 comes into contact with a bottom surface of the first mounting groove 332 while the first protrusion 336 is inserted into the empty space 114 of the first coil 110, and another part of the bottom surface of the second coil 120 except a part of the bottom surface partially overlapped with the first coil 110 comes into contact with a bottom surface of the second mounting groove 334 while the second protrusion 338 is inserted into the empty space 124 of the second coil 120 and then fixed with adhesives interposed therebetween.

Accordingly, not only the bottom surfaces but also inner sides and outer sides of the first coil 110 and the second coil 120 come into contact with a side surface of the first mounting groove 332 and a side surface of the second mounting groove 334, thereby further increasing shielding performance.

Although the embodiments of the present invention have been described above, the concept of the present invention is not limited to the embodiments disclosed in the specification and other embodiments may be provided by one of ordinary skill in the art through additions, changes, deletions, supplements, and the like but they will be included within the conceptual scope of the present invention.

The invention claimed is:

1. A transmission device for a wireless charger, comprising:
    a plurality of planar coils configured to transmit wireless power signals for wireless charge and arranged to be at least partially overlapped;
    a shielding sheet that comprises an attachment surface to which part of or the whole planar coils are fixed with an adhesive layer therebetween and shields a magnetic field generated by the planar coils; and
    a height deviation compensation means provided on the attachment surface to compensate an individual height deviation between each of the planar coils and the attachment surface.

2. The transmission device of claim 1, wherein the height deviation compensation means is a first protruding sheet that protrudes from the attachment surface at a certain height.

3. The transmission device of claim 2, wherein the plurality of planar coils comprise a first coil with one surface in direct contact with the attachment surface and a second coil stacked on the first coil to allow a part overlapped with the first coil and another part spaced apart from the attachment surface at a certain height, and
    wherein the part of the second coil not overlapped with the first coil comes in direct contact with the first protruding sheet.

4. The transmission device of claim 3, wherein the first protruding sheet is formed of a shielding sheet comprising a magnetic material to shield the magnetic field generated by the planar coils.

5. The transmission device of claim 3, wherein the first coil is provided to have an empty space at a center portion thereof, and the attachment surface comprises a second protruding sheet that protrudes at a certain height from an area thereof corresponding to the empty space in such a way that a side portion of the first coil comes into direct contact with the second protruding sheet.

6. The transmission device of claim 5, wherein the second protruding sheet is formed of a shielding sheet comprising a magnetic material to shield the magnetic field generated by the planar coils.

7. The transmission device of claim 1, wherein the height deviation compensation means is a mounting groove depressed at a certain depth from the attachment surface.

8. The transmission device of claim 7, wherein the plurality of planar coils comprise a first coil with one surface in direct contact with a bottom surface of the mounting groove and a second coil stacked on the first coil to allow a part to be overlapped with the first coil and another part to come into direct contact with the attachment surface.

9. The transmission device of claim 8, wherein the first coil is provided to have an empty space at a center portion thereof, and the bottom surface of the mounting groove comprises a protrusion that protrudes at a certain height from an area thereof corresponding to the empty space in such a way that a side portion of the first coil comes into direct contact with the protrusion.

10. The transmission device of claim 7, wherein the mounting groove comprises a plurality of mounting grooves having different depths, and
   wherein the plurality of planar coils are arranged to come into contact with bottom surfaces of mutually different ones of the plurality of mounting grooves.

11. A transmission device for a wireless charger, comprising:
   a shielding sheet that comprises an attachment surface and shields a magnetic field generated by a wireless power signal;
   a first coil that generates a wireless power signal and has one surface in contact with the attachment surface;
   a second coil that generates a wireless power signal and is stacked on the first coil to allow a part thereof to be overlapped with the first coil and another part to be spaced apart from the attachment surface at a certain height; and
   a protruding sheet that protrudes from the attachment surface at a certain height to compensate a height difference between the part of the second coil not overlapped with the first coil and the attachment surface.

* * * * *